Patented Oct. 23, 1951

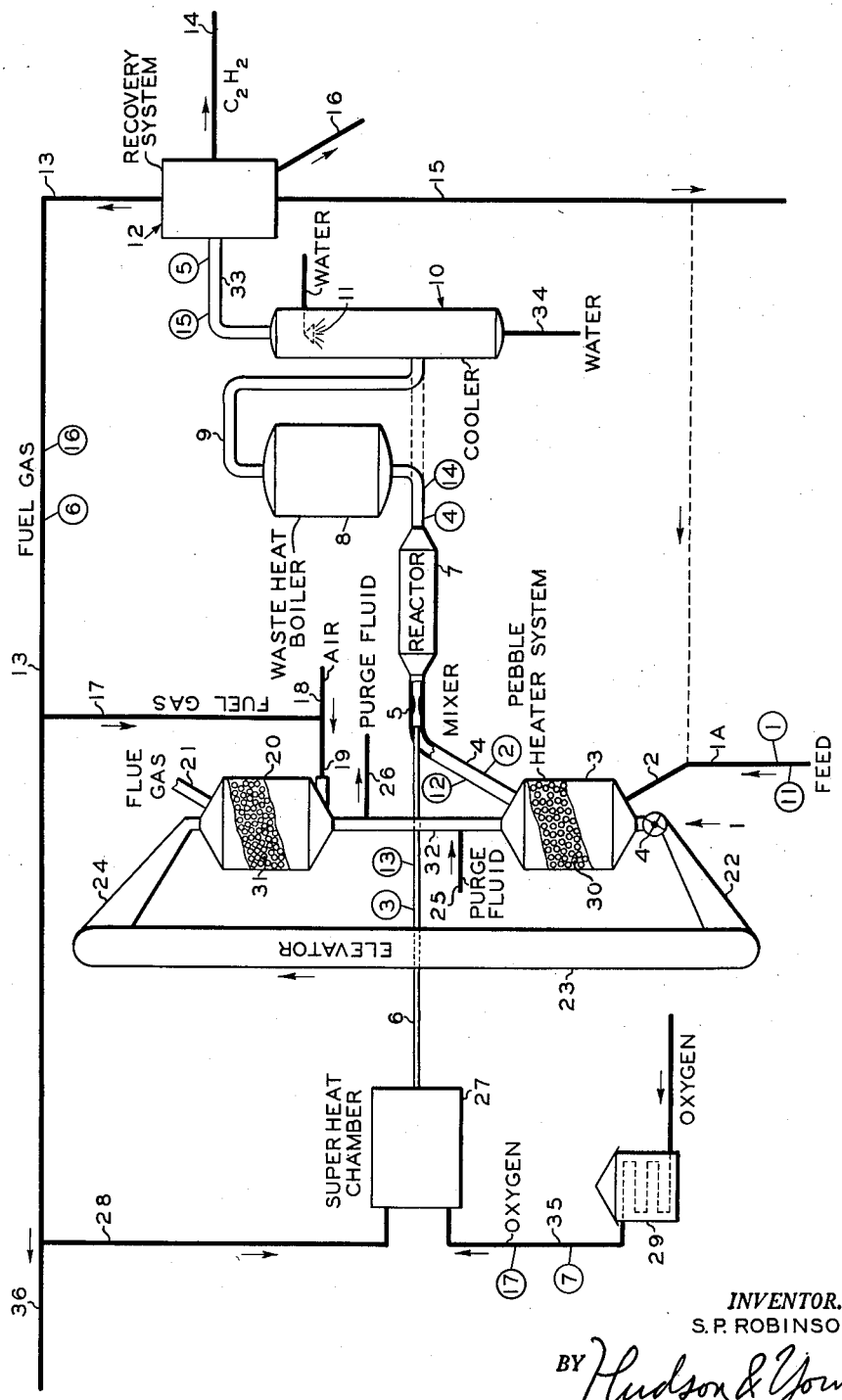

2,572,664

UNITED STATES PATENT OFFICE 2,572,664

MANUFACTURE OF ACETYLENE

Sam P. Robinson, Bartlesville, Okla., assignor to Phillips Petroleum Company, a corporation of Delaware Application December 29, 1947, Serial No. 794,365

3 Claims. (Cl. 260—679)

This invention relates to manufacture of acetylene. In one of its more specific aspects it relates to a method of production of acetylene in high yields and in relatively high concentration as compared to prior methods of manufacture of this material.

The manufacture of acetylene has heretofore been mainly limited to recovery as a by-product from other commercial operations such as thermal or catalytic cracking of hydrocarbons. In these recovery operations, acetylene ordinarily occurs in the hydrocarbon streams in concentrations of one per cent or less and sometimes only a few tenths of one per cent.

Of course the old method for manufacture of acetylene, as is well known, was by the reaction of calcium carbide with water in which acetylene gas was produced. This method furnished acetylene for welding and for chemical purposes for many years. For uses wherein relatively small quantities of acetylene is required the carbide method was very satisfactory. However, since acetylene is very active chemically and is the basic material for the manufacture of a vast multitude of organic compounds the cost of the manufacture of acetylene by the carbide method meets serious competition for acetylene manufactured by other methods. Even the acetylene as recovered as a by-product can ordinarily be recovered at a cheaper and lower figure than the cost for its manufacture from carbide.

An object of my invention is to provide a method for the manufacture of acetylene. Another object of my invention is to provide a relatively inexpensive method for the manufacture of acetylene. Still another object of my invention is to provide an easily controllable and easily operable method for the manufacture of acetylene. Still another object of my invention is to provide a method for the manufacture of acetylene wherein the yield of acetylene is relatively high based on the charge stock used in comparison to known processes. Yet another object of my invention is to provide a method for the manufacture of acetylene wherein the concentration of the acetylene in the product gases is high in comparison to conventional methods for making this gas. Still other objects and advantages of my process will be realized by those skilled in the art upon reading the following disclosure, which taken in conjunction with the appended drawing, respectively describes and illustrates my invention. The figure is a flow diagram illustrating the process of my invention.

In the disclosure and appended claims the terms "commercial oxygen" or "commercially pure oxygen" or the like are intended to be synonymous and to mean oxygen of commercial purity or of technical grade and commercially available as contrasted to a chemically pure product. Some commercial oxygen available contains about 90 to 95 per cent oxygen, the remainder being largely nitrogen.

Referring now to the drawing, reference numeral 1 refers to a pebble heater assembly which may, for the most part, be of more or less conventional design. This pebble heater assembly is composed of an upper chamber 20 in which the pebbles 31 are heated by direct contact with hot gases. The fuel gas for this heating enters through a fuel inlet pipe 19. Air for supporting this combustion enters through pipe 18 and is mixed with the fuel gas in pipe 19 at a point very close to the point at which pipe 19 enters the chamber 20. It is intended that the hot gases pass upwards through this chamber in countercurrent relation to the downflowing pebbles. The effluent combustion gases leave this chamber 20 by a flue gas pipe 21 which may conduct these gases to a stack for draft purposes, or they may be conducted to other disposal as desired. The heated pebbles leave the heater chamber 20 and flow downward through a connecting pipe 32 and enter the top of the heater vessel of this pebble heater assembly. Feed stock to be converted to acetylene enters the system through a pipe 1A, the gas passing on through pipe 2 into the lower portion of the heater vessel 3. This gas then passes upward in countercurrent relation to the downward flowing heated pebbles and by contacting therewith this feed gas becomes heated to a desired temperature. The heated gas then leaves the vessel 3 through an outlet pipe 4 under the influence of the pressure of the incoming feed stock in line 2 combined with the aspirating influence of gases from pipe 6. Reference numeral 5 refers to a venturi or other mixing device in which gases coming through pipe 6 mix with the heated hydrocarbon material from pipe 4. This heated mixture then passes into the reactor vessel 7 for a definite period of residence. From this reactor vessel 7 the hot reaction gases may pass directly to a cooling apparatus 10 or they may pass through a waste heat boiler assembly 8. If this latter assembly is used the partly cooled reaction gases leave the boiler assembly through a pipe 9 and enter the cooler 10 through the same inlet which would be used in case the reaction gases pass directly from the reactor into the cooler. This cooler assembly 10 may be any type of cooler apparatus desired, providing it be adapted to cool the reaction gases very rapidly to a temperature below which further hydrocarbon reaction can take place. This rapid quenching is intended to stop reaction of acetylene by polymerization or other reaction or reaction of other hydrocarbons with acetylene or any reaction whatever which might tend to decrease the concentration and ultimate yield of acetylene. This cooler assembly 10 may be made of any one unit or may be an assembly of several cooling units. The choice and the type of construction of this cooling apparatus may be dictated by conditions of time and construction by engineering or process considerations.

Under some conditions when this cooler assembly 10 is composed of several units a tar and liquid separator may be installed between the last two units.

The fully cooled gases from the cooler assembly 10 pass through a pipe 33 into an acetylene recovery system 12 This acetylene recovery system forms no part of my invention since any method of recovery of acetylene from the product gases may be used. The particular system or method used may be selected from among those commercially available. In the drawing pipe 13 is intended to carry uncondensed gases from this acetylene recovery system 12 to other parts of the plant or for such disposal as desired. Acetylene passes through pipe 14 to storage. Pipe 16 is intended to carry heavy oils or other condensate materials which are not needed for cyclic operation. Pipe 15 carries light or low boiling hydrocarbons from the separating system for recycling into the feed line 1A. Pipe 34 is a water draw from the water cooler assembly 10 while spray 11 is intended to show diagrammatically one method of quench cooling of the hot gases.

The gases from the acetylene recovery system which pass through pipe 13 are rich in hydrogen and accordingly possess a high B. T. U. content and a portion of these gases passes from line 13 through pipe 17 for mixture with air from pipe 18 in pipe 19 for passage into the pebble heater vessel 20. A second portion of the hydrogen rich gases from pipe 13 passes through pipe 28 as a fuel for the combustion in the superheat chamber 27. Commercially pure oxygen as defined hereinbefore from a source not shown passes through line 35 into the superheat chamber 27. If desired, this oxygen may be heated in a preheater apparatus 29 prior to passage to the superheat chamber 27. In this superheat chamber 27 it is intended that most of the hydrogen rich fuel gas from pipe 28 is burned with the oxygen from pipe 35 to form water vapor or steam at a very high temperature. The temperature of combustion and also the temperature of the hot steam leaving this superheat chamber 27 through pipe 6 may be controlled or rather tempered by addition of an excess of the fuel gas relative to the amount of oxygen added. In this manner overheating in the superheat chamber is prevented. Also by controlling the amount of excess fuel gas entering the superheat chamber 27 the temperature of the burned gases or steam passing through pipe 6 to the venturi mixer 5 is controlled so that the mixture of hot steam from the superheat chamber and the hydrocarbons from pipe 4 may be maintained at any optimum acetylene forming temperature required. As will be mentioned hereinafter many processes ordinarily produce more hydrogen rich fuel gas than is required for heating the pebbles in vessel 20 and for producing the hot combustion gases in chamber 27 and this excess may be passed through pipe 33 for any disposal as desired.

An important feature of my process resides in the concept of mixing preheated feed gases from pipe 4 with very hot combustion products from pipe 6, the mixing being done efficiently in venturi 5, and controlling the residence time of the mixture at the very high reaction temperature by the design of reactor 7. The volume of this reactor and the flow rate and temperature of the reactant mixture may be correlated so as to provide the optimum time-temperature relationships for the production of acetylene. The products leaving reactor 7 are, of course, rapidly cooled in cooling means 8 and 10 so as to stop all reactions.

By the use of oxygen or commercial oxygen as a combustion supporting gas in the superheater chamber 27, I am able to withdraw the combustion gases from this chamber through line 6 at substantially any desired temperature, even as high as 4000° F. or higher.

For use at such extremely high temperatures, the problem of refractories may become acute. This superheat chamber 27 may be lined with a lime stabilized zirconia or periclase (MgO). By use of such a superheat furnace and with a hydrogen rich fuel gas the combustion of which is supported by commercially pure oxygen, it is possible to get a very high heat release in this apparatus. The hydrogen rich fuel gas should be under sufficient pressure to insure a relatively high velocity of the combustion gases through the superheat chamber and through pipe 6 into the venturi 5.

High purity alumina may be used as refractory material for lining of the mixer 5 and the reactor 7 and adjacent apparatus. This refractory is very hard and resistant to abrasion and stable at temperatures as high as 3500° F.

In order to protect the alumina insulation of the mixer 5 and the reactor 7 and adjacent piping I prefer to inject the superheater (27) combustion gases into the hydrocarbon stream at the upstream side of the mixer 5. In this manner the superheater gases which may pass through pipe 6 at a temperature as high as 4000° F. or so do not impinge directly on the alumina refractory of the mixer. Since the length of time in which the hydrocarbon gases should be maintained at the acetylene forming temperature is very short the mixing of the hydrocarbon gases in the mixer 5 with the high temperature steam from pipe 6 should be very rapid, the residence time of this mixture in reactor 7 should also be very short and the length of time required for passage of the reaction gases from the reactor 7 to subsequent cooling apparatus should likewise be very short. In the specific processes which I will describe the length of residence time at the acetylene forming temperature may vary from about 0.005 to 0.02 second. Thus it is seen that the net volume of these apparatus parts should be quite small and at the same time the speed at which the reacting and reaction gases travel is quite rapid and in fact to obtain the desired contact time at the high temperatures gas velocities through the mixer 5 and reactor 7 will approach the velocity of sound. This velocity of course can easily be controlled by the design engineer in his design and construction of these apparatus parts. To illustrate the operation of my process for the making of acetylene I will describe two embodiments, the first of which includes the conditions for making acetylene from a natural gas and the second for making acetylene from a gas containing mostly ethane and also some methane and some propane.

EXAMPLE I

The operation of the apparatus for the production of acetylene from a natural gas is as follows. A natural gas from a source not shown passes through pipe 1A into the feed pipe 2 and from this pipe is passed into the heater chamber of the pebble heater assembly. This natural gas is very rapidly heated in this pebble heater to a temperature of about 2000° F. and during this rapid heating about three per cent of ethylene and two percent of acetylene is formed, with some hydrogen of course, mainly at the expense of the methane content. The effluent gas from the pebble heater at 2000° F. or possibly as high as 2300° F. leaves the heater through line 4 and enters the mixer 5. Hot steam or combustion gases from the superheat chamber at a temperature of 4000 to 4300° F. pass through line 6 into the mixer 5. The velocity of this hot gas is quite high and such velocity assists in passage of the heated hydrocarbon from the heater vessel 3 through the pipe 4 by aspiration and the mixture of hot steam from pipe 6 and the hydrocarbons from pipe 4 pass through the mixer 5 wherein the temperature of the hydrocarbons is increased to about 3000° F. with the simultaneous decreasing of the temperature of the hot steam from pipe 6 to this same 3000° temperature. The volume of the reactor 7 is so designed that the residence time of the reacting and reaction products in this vessel is about 0.005 second. The reaction products from this vessel leave the vessel at a temperature about 2900° F. and this product may pass through the waste heat boiler 8 and line 9 into the quencher 10 or they may pass directly from the reactor 7 to the quencher 10. By either route the reaction products enter the quencher 10 in a very short time after they leave the reactor 7 and in the quencher they are very rapidly cooled. As I have mentioned hereinbefore, this quencher 10 may be a multistage system, if desired, and it is to be so constructed since the cooling load on this apparatus is quite high. After proper cooling the cooled gases leave this quencher 10 through a pipe 33 at a temperature of about 100° F. and they pass into the acetylene recovery system 12. As mentioned hereinbefore this recovery system may be any suitable system for the recovery of acetylene from such gases. Acetylene passes through pipe 14 to storage or such immediate disposal as desired while any condensate or tarry-like material may be withdrawn through pipe 16 for disposal. The hydrogen rich fuel gas for use in the system leaves through the pipe 13 and some hydrocarbon gases suitable for recycling into the natural gas feed stock are removed through pipe 15. Whether or not the hydrocarbons from pipe 15 are recycled into the feed stock of course is a matter of choice but such recycling materially assists in increasing the overall yield of acetylene.

A portion of the hydrogen rich fuel gas leaving the acetylene recovery system through pipe 13 passes through pipe 17 and is united with some air through pipe 18, the mixture passing through the pipe 19 and burning in the combustion zone of pebble heating vessel 20. In this pebble heating vessel 20 the pebbles enter the top of this vessel through the pipe 24 at a temperature of about 700° F. and they leave the bottom of the vessel after being heated to a temperature of about 2400° F. The gases of combustion in this heating vessel 20 leave at a temperature of about 800° F. through the pipe 21 to be conducted to a stack for draft and disposal purposes.

The so-heated pebbles pass from the bottom of heater vessel 20 into the top of the hydrocarbon heater 3 at a temperature of about 2200° F. Purge fluid, such as steam, may be passed through pipe 25 into the tube 32 connecting vessels 20 and 3 to prevent flow of gases between 3 and 20. The purge fluid then leaves this connecting pipe through a pipe 26.

The hydrocarbon feed for heating in vessel 3 enters the vessel at about atmospheric temperature and therein is heated very rapidly. In this embodiment the natural gas is heated and cracked to some extent and leaves the heating vessel 3 at a temperature of about 2000° F. or so. The pebbles leaving the bottom of this heater vessel 3 are sufficiently cooled by the incoming natural gas feed stock that they may flow through a pipe 22 made of ordinary steel to be elevated in the elevator 23 which may also be constructed of ordinary materials. The elevator 23 then discharges the pebbles into the chute 24 and of course from chute 24 the pebbles enter the pebble heating chamber 20.

In this pebble heater assembly the pebbles are maintained in a contiguous column from the top of vessel 20 to the bottom of vessel 3 and their rate of travel by gravity through these vessels may be controlled by a valve at the pebble outlet end of the vessel 3 or may be controlled by the rate of operation of the elevator 23. Thus if it is desired to increase the rate of circulation of pebbles the outlet valve 34 may be operated at a faster speed if such valve is used, or the rate of speed of the elevator may be increased to the desired extent.

A portion of the hydrogen rich fuel gas from the acetylene recovery system and passing through pipe 13 is passed through pipe 28 for use in the superheat chamber 27. Oxygen of commercial purity enters the superheat chamber 27 through a pipe 35. This oxygen may be preheated in a heater 29 if desired, or it may be passed directly from storage or its production apparatus through pipe 35 into the chamber 27. In this chamber 27 then a gas containing in the neighborhood of 84% hydrogen is burned by this commercially pure oxygen and such combustion takes place at a very high temperature. It may be desirable to pass an excess of the hydrogen rich fuel gas through pipe 28 into the chamber 27 relative to the amount of oxygen supplied to decrease or to temper the temperature in this superheat chamber 27. According to the embodiment of my invention in which I make acetylene gas from natural gas I pass about 150% excess of the hydrogen rich fuel gas over that required for combustion in this chamber 27. In this manner I am able to control the temperature of the combustion gases which, of course are largely steam, in the chamber 27 for passage through pipe 6 into the mixer 5. If temperatures were too high in the superheat chamber 27 the refractory liner of course might fail and of course the hydrocarbons entering the mixer 5 could be heated to too high a temperature for maximum acetylene production. Thus by controlling the amount of excess fuel gas to the superheat chamber 27 I am able to control numerous of the variables of my process. In the following table are given the composition of the natural gas feed stock and of the materials in process at various points of the process. Temperatures at several process points are also given. Stream numbers on the drawing are circled.

of about 2500° F. Residence time at this temperature is about 0.02 second. The reaction effluents leave this reactor 7 at a temperature about 2450° F. and they pass through the waste heat boiler 8, pipe 9 into the cooler assembly 10 or the effluent may pass directly from the reactor 7 into the cooler 10. The gases leave this cooler 10 at a temperature of about 100° F. through pipe 33 and pass to the acetylene recovery system 12. From this recovery system 12 hydrogen rich fuel gas leaves by pipe 13, the acetylene by pipe 14, hydrocarbons suitable for recycling through pipe 15 and any other material separated in the system may leave through pipe 16 for such disposal as desired. The hydrocarbons suitable for re-

*Table I*

| Component | Stream Number | | | | | | |
|---|---|---|---|---|---|---|---|
| | (1) Vol. Per Cent | (2) Vol. Per Cent | (3) Vol. Per Cent | (4) Vol. Per Cent | (5) Vol. Per Cent | (6) Vol. Per Cent | (7) Vol. Per Cent |
| $CH_4$ | 92 | 85 | | 4 | 5 | 8 | |
| $C_2H_2$ | | 2 | | 9 | 11 | | |
| $C_3H_4$ | | 3 | | 2 | 2 | | |
| $C_2H_6$ | 4 | | | | | | |
| $C_3H_6$ | | | | | | | |
| $C_3H_8$ | 1 | | | | | | |
| $C_4+$ | | | | | | | |
| C and tar | | | | | | | |
| $H_2$ | | 7 | 56 | 61 | 74 | 84 | |
| CO | | | 3 | 2 | 2 | } 5 | |
| $CO_2$ | | | 3 | 2 | 3 | | |
| $N_2$ | 3 | 3 | 3 | 2 | 3 | 3 | 5 |
| $H_2O$ | | | 33 | 18 | | | |
| $O_2$ | | | 2 | | | | 95 |
| Temperature °F | Atm. | 2,000 | 4,000 | 2,900 | 100 | | |

In Table II are given the volumes of the materials in process at various points of the process per 1,000 volumes of natural gas feed stock. The net heating value of the hydrogen rich fuel gas is 320–350 B. t. u. per cubic foot. The temperature of the mixed feed to the reactor is 3000° F.

*Table II*

| Stream or Product | Vol., Std. cu. ft. |
|---|---|
| (1) Feed, cu. ft | 1,000 |
| (6) $H_2$ rich fuel gas | 2,600 |
| $H_2$ rich fuel gas—by product | 350 |
| $H_2$ rich fuel gas—to super-heat furnace | 1,800 |
| $H_2$ rich fuel gas—to pebble heater | 450 |
| $C_2H_2$ product | 315 |
| $C_3H_4$ | 53 |
| $O_2$—for super-heat furnace | 500 |
| Mixed feed to reactor | |

EXAMPLE II

In the embodiment of my invention which I will now describe, I use a hydrocarbon feed stock containing about 67½% ethane and the remainder about equally divided between methane and propane. Such a feed stock passes through pipe 1A and 2 into the hydrocarbon heater 3 in which this material is heated to a temperature of about 1700° F. Residence time permitted in this vessel is about 0.03 second. The heated hydrocarbon material leaves this vessel 3 through pipe 4 at a temperature of about 1700° F. and enters the mixer 5 in which it is heated by contact with hot steam at about 4000° F. from pipe 6. This hot steam from pipe 6 flows at a very high velocity and this high velocity assists in aspirating and expediting the flow of hydrocarbons from heater 3 through the pipe 4. The mixture formed in mixer 5 enters the reactor 7 at a temperature cycling which leave through the pipe 15 may be such as ethylene and ethane. A portion of the hydrogen rich fuel gas from pipe 13 is passed through pipe 17 and with air from pipe 18 passes through pipe 19 for combustion in the combustion zone of pebble heater vessel 20, combustion gases from which leave through pipe 21 for disposal. Pebbles in this heater leave the bottom at a temperature of about 2200° F. and reach the top of vessel 3 at a temperature of about 1900° F. The pebbles transferred through the pipe connection between these two vessels may be purged with steam or other inert fluid if desired. Pebbles may be removed from the hydrocarbon heating vessel 3 and elevated to the heater vessel 20 as previously described herein.

Another portion of the hydrogen rich fuel gas from pipe 13 is passed through pipe 28 for combustion with commercially pure oxygen in the super-heating chamber 27. About 130% excess of this hydrogen rich fuel gas relative to the amount of oxygen furnished efficiently control the combustion temperature in the chamber 27. Reasons for such temperature control have been given hereinbefore. Combustion gases or steam at a temperature of about 4000° F. leave the super-heat chamber 27 through pipe 6 and pass therethrough into the mixer 5 for aspirating the heated hydrocarbons from pipe 4 and for heating them to a desired reaction temperature.

Any excess hydrogen rich fuel gas, and there usually is an appreciable quantity not required for the process, may be passed from pipe 13 through pipe 36 to such disposal as desired. In Table III which follows are given the concentrations of the feed stock and of the gases in process at various process points. Temperatures of the gases at various process points are also given.

Table III

| Component | Stream Number | | | | | | |
|---|---|---|---|---|---|---|---|
| | (11) Vol. Per Cent | (12) Vol. Per Cent | (13) Vol. Per Cent | (14) Vol. Per Cent | (15) Vol. Per Cent | (16) Vol. Per Cent | (17) Vol. Per Cent |
| $CH_4$ | 19.0 | 22 | | 5.9 | 6.7 | 8 | |
| $C_2H_2$ | | 2 | | 13.0 | 14.8 | | |
| $C_2H_4$ | | 3.2 | | 3.2 | 3.6 | | |
| $C_2H_6$ | 67.5 | 6 | | 0.3 | 0.4 | | |
| $C_3H_6$ | | 1 | | | | | |
| $C_3H_8$ | 13.5 | 0.5 | | | | | |
| $C_4+$ | | 0.5 | | | | | |
| C and tar....per cent by weight | | 3 | | 17 | | | |
| $H_2$ | | 36 | 54.6 | 61.0 | 69.8 | 87 | |
| CO | | | 6.6 | 2.4 | 2.6 | 3 | |
| $CO_2$ | | | 3.1 | 1.2 | 1.3 | 1 | |
| $N_2$ | | | 1.6 | 0.6 | 0.8 | 1 | 5 |
| $H_2O$ | | | 32.3 | 12.4 | | | |
| $O_2$ | | | 1.8 | | | | 95 |
| Temperature °F | | 1700 | 4000 | 2450 | 100 | | |

In Table IV which follows are given volumes of the gases in process at various process points per 1000 cubic feet of feed gas.

Table IV

| Stream or Product | Vol. Std. cu. ft. | B. t. u. content |
|---|---|---|
| (11) Feed | 1,000 | |
| (12) | 1,690 | |
| (13) | 1,980 | |
| Mixed Feed to Reactor | 3,937 | |
| (14) | 3,937 | |
| (15) | 3,444 | |
| (16) $H_2$-rich fuel gas | 2,770 | 324 |
| $C_2H_2$ product | 514 | |
| $C_2H_4$ by product } recycle | 126 | |
| $C_2H_6$ by product } recycle | 12 | |
| $H_2$-rich fuel gas to pebble heater | 605 | 324 |
| $H_2$-rich fuel gas to super-heat furnace | 1,365 | 324 |
| $H_2$-rich fuel gas to by product | 800 | 324 |
| Oxygen for super-heat furnace | 394 | |

By use of oxygen, or rather commercial oxygen for the combustion of the fuel gas in my system many advantages are apparent, one of which is this hydrogen rich fuel gas is substantially free from nitrogen, that is, it contains only 1% and accordingly this gas has a relatively high B.t.u. content which ranges from about 320 to about 350 B.t.u. per cubic foot. If this gas were diluted with large quantities of nitrogen its value as a fuel would be negligible. Because the fuel gas is low in nitrogen and hydrocarbon content, the concentration of nitrogen and of carbon dioxide in the effluent hot gases from the super-heat chamber 27 is very low and thus corrosive acid gases such as HCN and $CO_2+$ steam or water are substantially absent.

The purification of acetylene is also greatly simplified in the absence of nitrogen.

As mentioned hereinbefore in either embodiment of my invention I use an excess of hydrogen rich fuel gas to buffer or temper the combustion in the super-heat chamber 27 and the presence of excess hydrogen tends to buffer or reduce the deterioration of acetylene into carbon and hydrogen and also it tends to retard the reaction of acetylene with steam with the simultaneous formation of CO and hydrogen.

The term "pebble" as referred to throughout this specification may be defined as any particulate refractory contact material which is readily flowable through a contact chamber. Pebbles are preferably spherical in form and may range from ⅛ inch to 1 inch in diameter but spheres ranging in size from about ¼ to ½ inch are most practical. Uniform shapes and sizes are preferred but pebbles of unrelated shape and size may also be used. Pebbles may be made of ceramic materials such as alumina, mullite, periclase, forsterite, spinel, etc. The pebbles should be made from materials which have no adverse catalytic effect on the hydrocarbons at the temperatures of contact of the pebbles and the hydrocarbons. Alumina pebbles are common in the art. Materials of construction of my apparatus may be selected from among those commercially available. Even those refractories required to withstand temperatures as high as 4000° F. are now commercially available. The mixer 5 and the reactor 7 may be conveniently assembled on the structural members or assembly which support the pebble heater chamber so that the connecting pipes and tubes will be short for purposes of controlling contact times at high temperature and minimizing heat loss. Likewise the waste boiler if used may be assembled close at hand for similar reasons. Connections from the waste heat boiler to the cooler 10 may similarly be relatively short by placing the cooler assembly adjacent the pebble heater apparatus. The purification system for recovery of acetylene and separation of the hydrogen rich fuel gas and other materials may be located at any convenient point since the residence time of the acetylene and hydrogen containing gases on passage from the cooler 10 to the recovery system 12 may be any length of time desired.

It will be obvious to those skilled in the art that the embodiments of my invention may be modified for specific conditions and that many variations and alterations in apparatus and process operation may be made and yet remain within the intended spirit and scope of my invention.

Having disclosed my invention, I claim:

1. A process for producing acetylene comprising maintaining a downward moving bed of pebbles in a pebble heating zone, introducing a combustible mixture of a fuel gas with air into said pebble heating zone and therein burning said gas to supply heat for heating said pebbles, transferring the heated pebbles from said pebble heating zone to a normally gaseous hydrocarbon preheating zone and therein maintaining a downward flowing bed of heated pebbles, introducing a normally gaseous hydrocarbon into the hydrocarbon preheating zone, flowing the hydrocarbon through this preheating zone countercurrently to the downwardly flowing pebbles, withdrawing preheated normally gaseous hydrocarbon from said preheating zone at a temperature from 1700° to 2300° F., removing pebbles from this latter zone and transferring the removed pebbles to the pebble heating zone, introducing a combustible mixture of a fuel gas comprising at least 84% hydrogen with a stoichiometric deficiency of a commercial grade of oxygen for combustion of the hydrogen into a combustion zone and therein burning the hydrogen to produce steam in a superheated condition, introducing this superheated steam at high velocity through the jet of an aspirator zone, introducing the preheated hydrocarbon into said aspirator zone by the aspirating action of said steam passing through said jet, proportioning the steam and preheated hydrocarbon entering said aspirator zone to heat the hydrocarbon to a temperature above about 2450° F. for less than 0.02 second, rapidly quenching this mixture to below reaction temperature to stop further reaction and thereby produce a gaseous mixture containing at least 10% acetylene and a maximum of about 5% oxides of carbon, separating the acetylene from this quenched mixture, separating a stream of at least 84% hydrogen from said mixture and recycling the separated hydrogen to said combustion zone without any removal of oxides of carbon therefrom.

2. The process of claim 1 in which said separation steps include separating normally gaseous none-acetylenic hydrocarbons from said mixture and recycling the same with said stream of normally gaseous hydrocarbons into contact with said hot pebbles whereby complete tar removal is not essential.

3. The process of claim 2 in which a portion of said separated stream of at least 84% hydrogen is employed as said fuel gas with air in said pebble heating zone to preheat said pebbles before said countercurrent contact and burn any carbonaceous residue therefrom.

SAM P. ROBINSON.

REFERENCES CITED

The following references are of record in the file of this patent:

UNITED STATES PATENTS

| Number | Name | Date |
|---|---|---|
| 2,343,866 | Hincke | Mar. 14, 1944 |
| 2,371,147 | Burk | Mar. 13, 1945 |
| 2,399,450 | Ramseyer | Apr. 30, 1946 |

OTHER REFERENCES

Perry "Chemical Engineer's Handbook," 2nd Ed.—1941, page 1542 McGraw Hill Book Co.